US010997468B2

(12) United States Patent
Sacheti et al.

(10) Patent No.: US 10,997,468 B2
(45) Date of Patent: *May 4, 2021

(54) ENSEMBLE MODEL FOR IMAGE RECOGNITION PROCESSING

(71) Applicant: Microsoft Technology Licensing, LLC, Redmond, WA (US)

(72) Inventors: Arun Sacheti, Sammamish, WA (US); Fnu Yokesh Kumar, Kirkland, WA (US); Saurajit Mukherjee, Kirkland, WA (US); Nikesh Srivastava, Redmond, WA (US); Yan Wang, Mercer Island, WA (US); Kuang-Huei Lee, Bellevue, WA (US); Surendra Ulabala, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,528

(22) Filed: Feb. 24, 2020

(65) Prior Publication Data
US 2020/0193237 A1 Jun. 18, 2020

Related U.S. Application Data

(63) Continuation of application No. 15/840,823, filed on Dec. 13, 2017, now Pat. No. 10,607,118.

(51) Int. Cl.
*G06K 9/62* (2006.01)
*G06F 16/532* (2019.01)
(Continued)

(52) U.S. Cl.
CPC ......... *G06K 9/6262* (2013.01); *G06F 16/532* (2019.01); *G06F 16/5838* (2019.01);
(Continued)

(58) Field of Classification Search
CPC .. G06K 9/6262; G06K 9/6268; G06K 9/6256; G06F 16/5838; G06F 16/532
See application file for complete search history.

(56) References Cited

U.S. PATENT DOCUMENTS

2017/0364537 A1* 12/2017 Kariman ............. H04L 63/1433

OTHER PUBLICATIONS

Weston, Jason, Samy Bengio, and Nicolas Usunier. "Large scale image annotation: learning to rank with joint word-image embeddings." Machine learning 81.1 (2010): 21-35. (Year: 2010).*

* cited by examiner

*Primary Examiner* — Menatoallah Youssef
(74) *Attorney, Agent, or Firm* — Medley, Behrens & Lewis, LLC

(57) ABSTRACT

Non-limiting examples described herein relate to ensemble model processing for image recognition that improves precision and recall for image recognition processing as compared with existing solutions. An exemplary ensemble model is configured enhance image recognition processing through aggregate data modeling processing that evaluates image recognition prediction results obtained through processing that comprises: nearest neighbor visual search analysis, categorical image classification analysis and/or categorical instance retrieval analysis. An exemplary ensemble model is scalable, where new segments/categories can be bootstrapped to build deeper learning models and achieve high precision image recognition, while the cost of implementation (including from a bandwidth and resource standpoint) is lower than what is currently available across the industry today. Processing described herein, including implementation of an exemplary ensemble data model, may be exposed as a web service that is standalone or integrated within other applications/services to enhance processing (Continued)

efficiency and productivity applications/services such as productivity applications/services.

20 Claims, 9 Drawing Sheets

(51) Int. Cl.
*G06F 16/583* (2019.01)
*G06K 9/00* (2006.01)
(52) U.S. Cl.
CPC ....... *G06K 9/00684* (2013.01); *G06K 9/6256* (2013.01); *G06K 9/6268* (2013.01); *G06K 9/6271* (2013.01)

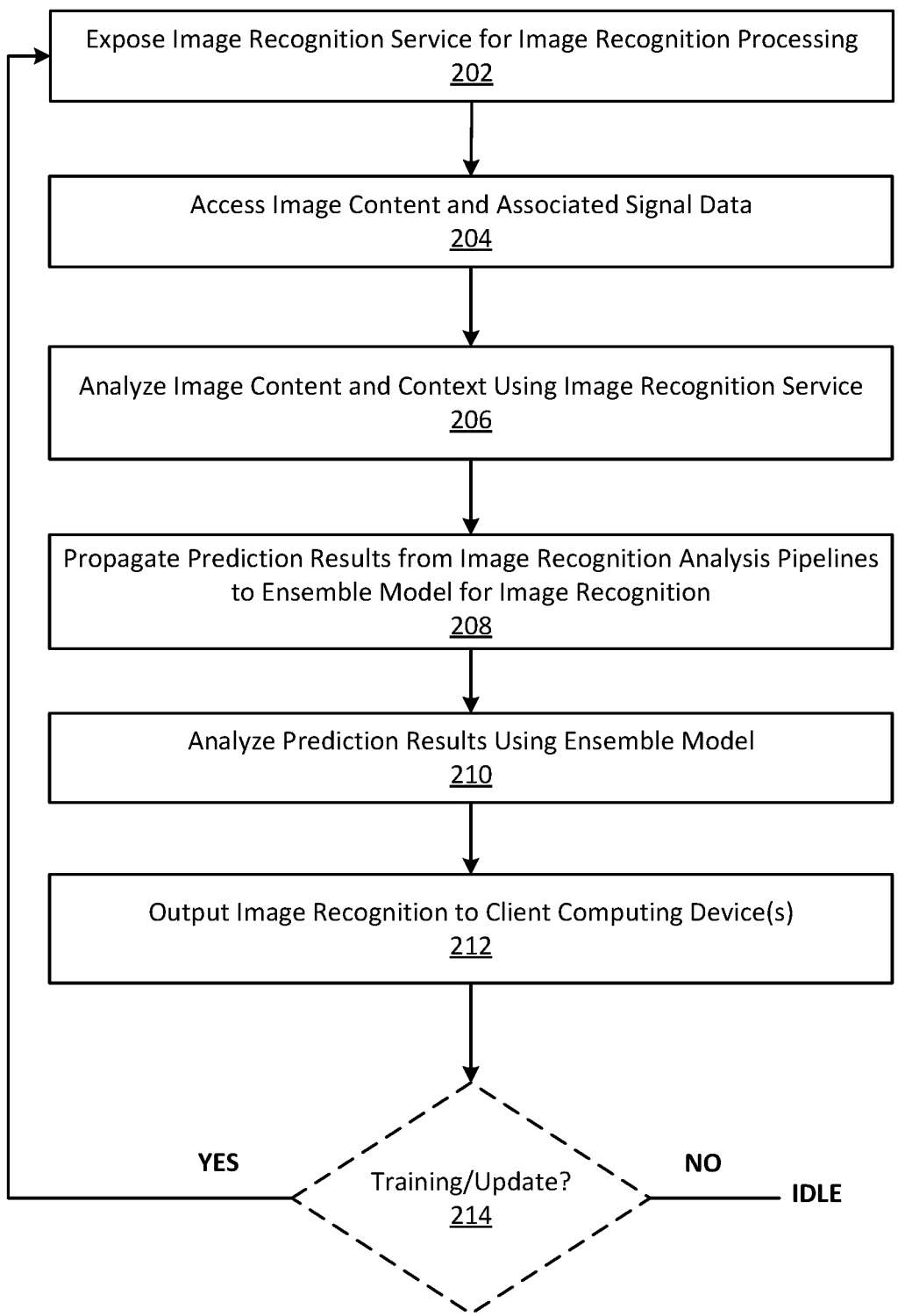

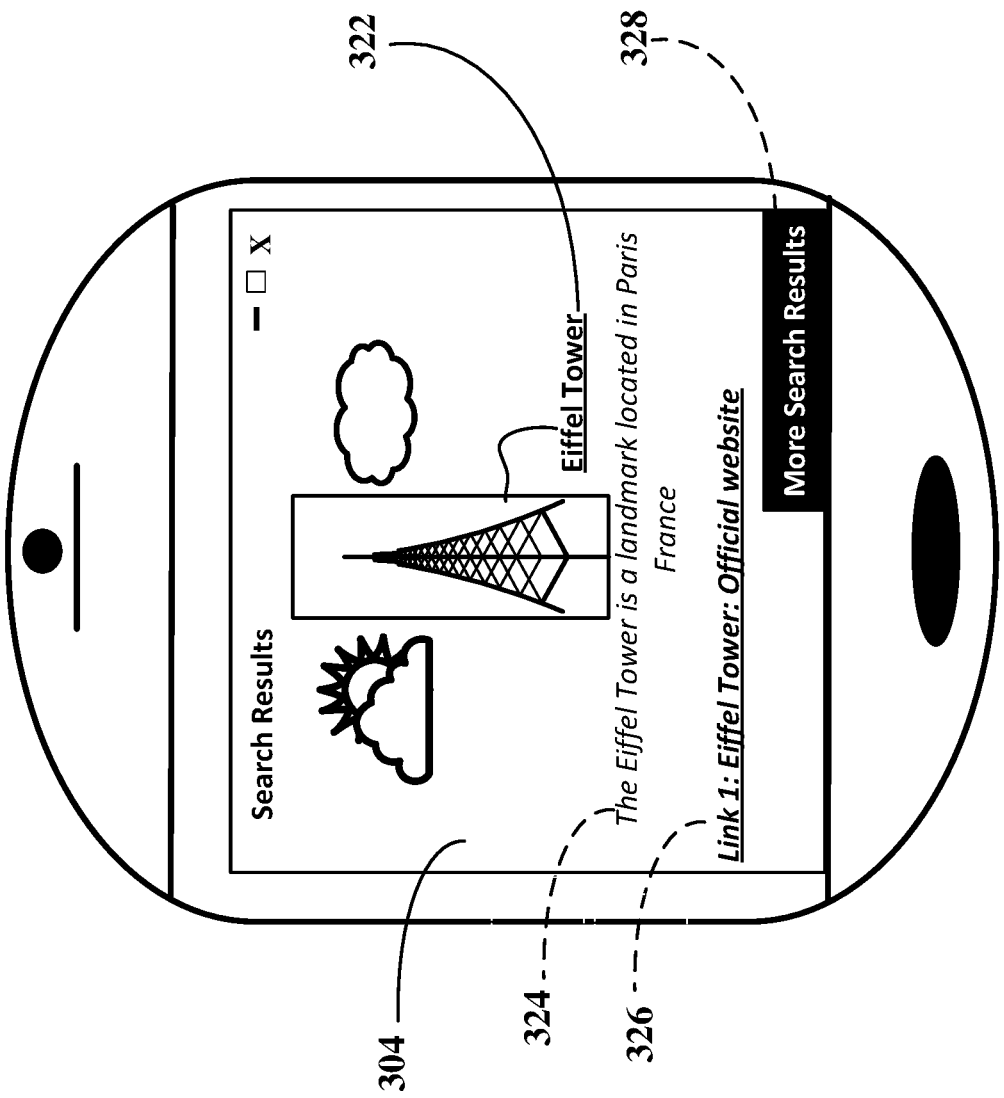

ENSEMBLE MODEL FOR IMAGE RECOGNITION PROCESSING

CROSS-REFERENCE TO RELATED APPLICATIONS

This application is a continuation of and claims priority to U.S. Non-Provisional patent application Ser. No. 15/840,823 entitled "ENSEMBLE MODEL FOR IMAGE RECOGNITION PROCESSING", filed on Dec. 13, 2017, which is hereby incorporated by reference herein, in its entirety.

BACKGROUND

Image classification techniques implemented today provide respectable precision and recall for image recognition processing. However, precision and recall can stand to be improved. Consider an example where an image of a building is taken from a specific angle. An image retrieval database may contain images of that building from a variety of angles but may not include an image from the specific angle as taken by a user. When the image retrieval database is searched, nearest neighbor images may be identified to find the closest predicted match for image recognition purposes. This leaves doubt as to the correctness of the image recognition prediction. As such, processing that increases precision and recall for image recognition provides great technical benefit for computing devices (interfacing with applications/services) for image recognition processing.

Furthermore, most of the image classification techniques today are limited to scale through large amount training data for, example, where modeling may be trained based on an index of various images or a set of categories within a segment. While this may provide high precision for image classification it is very challenging to scale for problem space where users of applications/services expect systems to be able to classify any object that user points camera to with both high recall and high precision. As more and more image content and/or classification data becomes available, data models need to be adapted to be able to account for such data (and further be trained based on such data).

Presently, most image classification techniques are related to individual data models that suffer from precision shortcomings, recall shortcomings and/or scalability issues. There is usually a trade-off where an implemented solution may be able to obtain high precision (or high recall) in image recognition but suffer from low recall (or low precision). For instance, a segment agnostic index (e.g. text/terms/entities) may be used to classify image content. While such a solution produces high recall for image recognition, it suffers from low precision in correctness of image recognition processing. In other instances, image-based classifications models may be implemented. Image-based classification models may produce high-precision for image recognition but such an approach may lack scalability when new segments are added. For instance, a large amount of training is required to integrate a new segment into an image-based classification model. In other instances, a retrieval database may be configured for image recognition processing (e.g. identify a nearest neighbor image). While such a solution produces adequate recall and precision, it also suffers from scalability issues when classification categories are introduced (and may rapidly change).

SUMMARY

In regard to the foregoing technical problems, non-limiting examples described herein relate to ensemble model processing for image recognition that improves precision and recall for image recognition processing as compared with existing solutions. An exemplary ensemble model is configured enhance image recognition processing through aggregate data modeling processing that evaluates image recognition prediction results obtained through processing that comprises: nearest neighbor visual search analysis, categorical image classification analysis and/or categorical instance retrieval analysis. An exemplary ensemble model is scalable, where new segments/categories can be bootstrapped to build deeper learning models and achieve high precision image recognition, while the cost of implementation (including from a bandwidth and resource standpoint) is lower than what is currently available across the industry today. Processing described herein, including implementation of an exemplary ensemble data model, may be exposed as a web service that is standalone or integrated within other applications/services to enhance processing efficiency and productivity applications/services such as productivity applications/services.

In one example, an exemplary image recognition service is configured to execute data model processing to generate image recognition of entities in image content. For instance, image content and context for the image content are analyzed using at least two image recognition analysis pipelines that are executing in parallel. Exemplary image recognition analysis pipelines comprise: a first image recognition analysis pipeline that executes visual classification modeling and a second image recognition analysis pipeline that executes visual search modeling. Depending on preliminary processing analysis (e.g. understanding of intent, categorical classification, etc.), the image recognition service may be configured to selectively utilize processing from three different data models that may execute image recognition analysis in parallel. For instance, two or more different data models for image recognition may be executed in parallel from any of: a category-specific classification model, an instance retrieval classification model and a visual search (e.g. web search model). Data from the respective models may be further shared between the different data models to enhance processing of the image recognition service.

Prediction results from the first image recognition analysis pipeline and the second image recognition analysis pipeline are propagated to an ensemble model for image recognition. Exemplary prediction results comprise confidence scoring respectively assigned by the visual classification modeling and the visual search modeling. The ensemble model is configured to analyze the prediction results from the different image recognition analysis pipelines and generate a final ranking for image recognition of the image content. Collectively, the ensemble model is configured to analysis results from the two or more different data models to generate a final ranking for image recognition. In one example, input into an exemplary ensemble model comprises image recognition prediction results from at least 3 different data models that are configured for image recognition analysis as referenced above. Image recognition for the image content may be output based on the final ranking generated by the ensemble model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates an exemplary method related to image recognition processing with which aspects of the present disclosure may be practiced.

FIGS. 3A-3B illustrate exemplary processing device views presenting user interface examples that illustrate results from image recognition processing with which aspects of the present disclosure may be practiced.

DETAILED DESCRIPTION

Figure 1A:
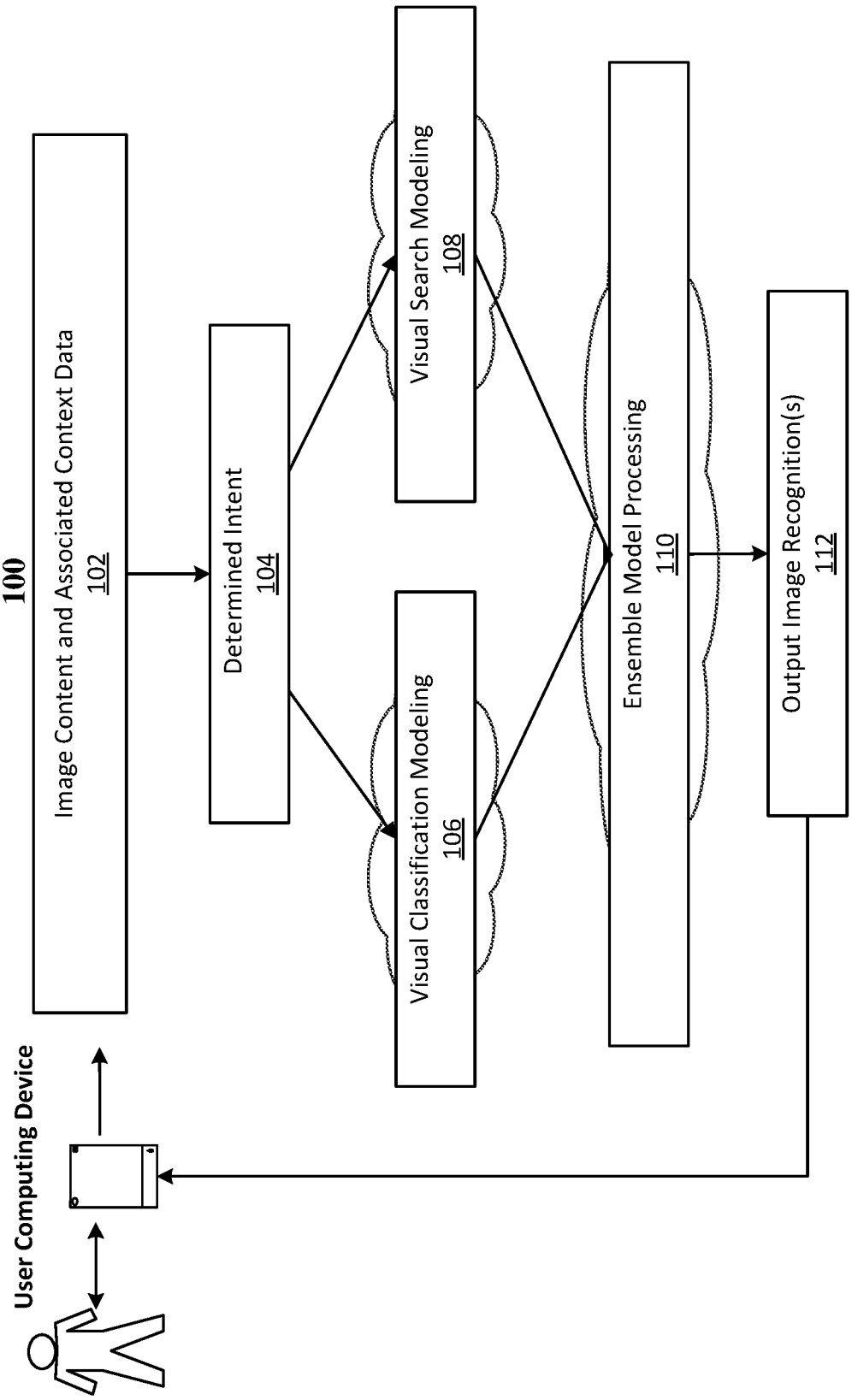
FIGS. 1A-1B illustrate exemplary process flows related to image recognition processing with which aspects of the present disclosure may be practiced.

Non-limiting examples described herein relate to ensemble model processing for image recognition that improves precision and recall for image recognition processing as compared with existing solutions. An exemplary ensemble model is configured enhance image recognition processing through aggregate data modeling processing that evaluates image recognition prediction results obtained through processing that comprises: nearest neighbor visual search analysis, categorical image classification analysis and/or categorical instance retrieval analysis. An exemplary ensemble model is scalable, where new segments/categories can be bootstrapped to build deeper learning models and achieve high precision image recognition, while the cost of implementation (including from a bandwidth and resource standpoint) is lower than what is currently available across the industry today. Processing described herein, including implementation of an exemplary ensemble data model, may be exposed as a web service that is standalone or integrated within other applications/services to enhance processing efficiency and productivity applications/services such as productivity applications/services.

In one example, an exemplary image recognition service is configured to execute data model processing to generate image recognition of entities in image content. For instance, image content and context for the image content are analyzed using at least two image recognition analysis pipelines that are executing in parallel. Exemplary image recognition analysis pipelines comprise: a first image recognition analysis pipeline that executes visual classification modeling and a second image recognition analysis pipeline that executes visual search modeling. Depending on preliminary processing analysis (e.g. understanding of intent, categorical classification, etc.), the image recognition service may be configured to selectively utilize processing from three different data models that may execute image recognition analysis in parallel. For instance, two or more different data models for image recognition may be executed in parallel from any of: a category-specific classification model, an instance retrieval classification model and a visual search (e.g. web search model). Data from the respective models may be further shared between the different data models to enhance processing of the image recognition service.

An exemplary image recognition application/service may be configured to execute semantic analysis on image content and associated context data. As an example, an intent may be inferred based on semantic analysis of the image content and context data (e.g. signal data) associated with the image content. Image content, context data and an inferred intent may be propagated to image recognition analysis pipelines that apply, in parallel, different forms of data modeling for image recognition. Exemplary visual classification modeling may comprise determining a top-level categorical classification for the image content. For instance, a categorical classification of the image content may be determined and propagated for subsequent classification modeling and visual search modeling, which can enhance processing of downstream image recognition components. Categorical classification may be propagated to one or more data models for visual classification modeling (e.g. category-specific classification model and/or instance retrieval classification model). In one example, a specific classification model is selected based on the top-level categorical classification. For instance, a category-specific classification model may be available that corresponds with a top-level categorical classification. In parallel, the image content (and associated context data) may be processed using an instance retrieval classification model that utilizes the top-level categorical classification in a trained model to evaluate image content according to the top-level classification. Moreover, a top-level categorical classification may be propagated to an exemplary visual search modeling, that executes a visual search (e.g. via web index) to identify nearest neighbor images for the image content.

Prediction results from the different image recognition analysis pipelines may be propagated to an exemplary ensemble model for image recognition. The ensemble model for image recognition is configured to aggregate prediction results from the different image recognition analysis pipelines and generate a final prediction regarding image recognition, which the image recognition service can pass along to specific applications/services (e.g. productivity applications/services). The exemplary ensemble model may be trained using image-entity prediction pairs (e.g. crowd-sourced and/or machine learning generated) to evaluate correctness of predictions made by the different image recognition models, thus making the ensemble model scalable to work with a plurality of different image recognition models. In one example, prediction results from two or more different data models (e.g. categorical classification model, instance retrieval classification model and visual search modeling) may be analyzed to generate a final image recognition for the image content. In one alternative example, an exemplary ensemble model may be configured to select prediction results from a specific image recognition analysis pipeline based on evaluation of associated confidence scoring (in association with the training of the ensemble model). In another alternative example, the exemplary ensemble model may be configured to validate an image recognition assessment using the prediction results from the different image recognition analysis pipelines.

Accordingly, the present disclosure provides a plurality of technical advantages, among other examples, that include but not limited to: generation, training and implementation of a new exemplary ensemble model achieving image recognition precision and recall for wide set of categories not achievable with any of the traditional approaches in isolation, improving scalability of image recognition applications/services with a configuration that new depth segments can be bootstrapped relatively quickly, improved processing efficiency of computing devices associated with an exemplary image recognition application/service (e.g. reduction in processing cycles, reduction in latency, better management of storage/memory of computing devices) for computing devices that are utilized for image recognition processing, improving cross-application usage and productivity and improved user interaction and productivity with front-end user interfaces and associated applications/services that interface with an exemplary image recognition service, among other examples.

Figure 1B:
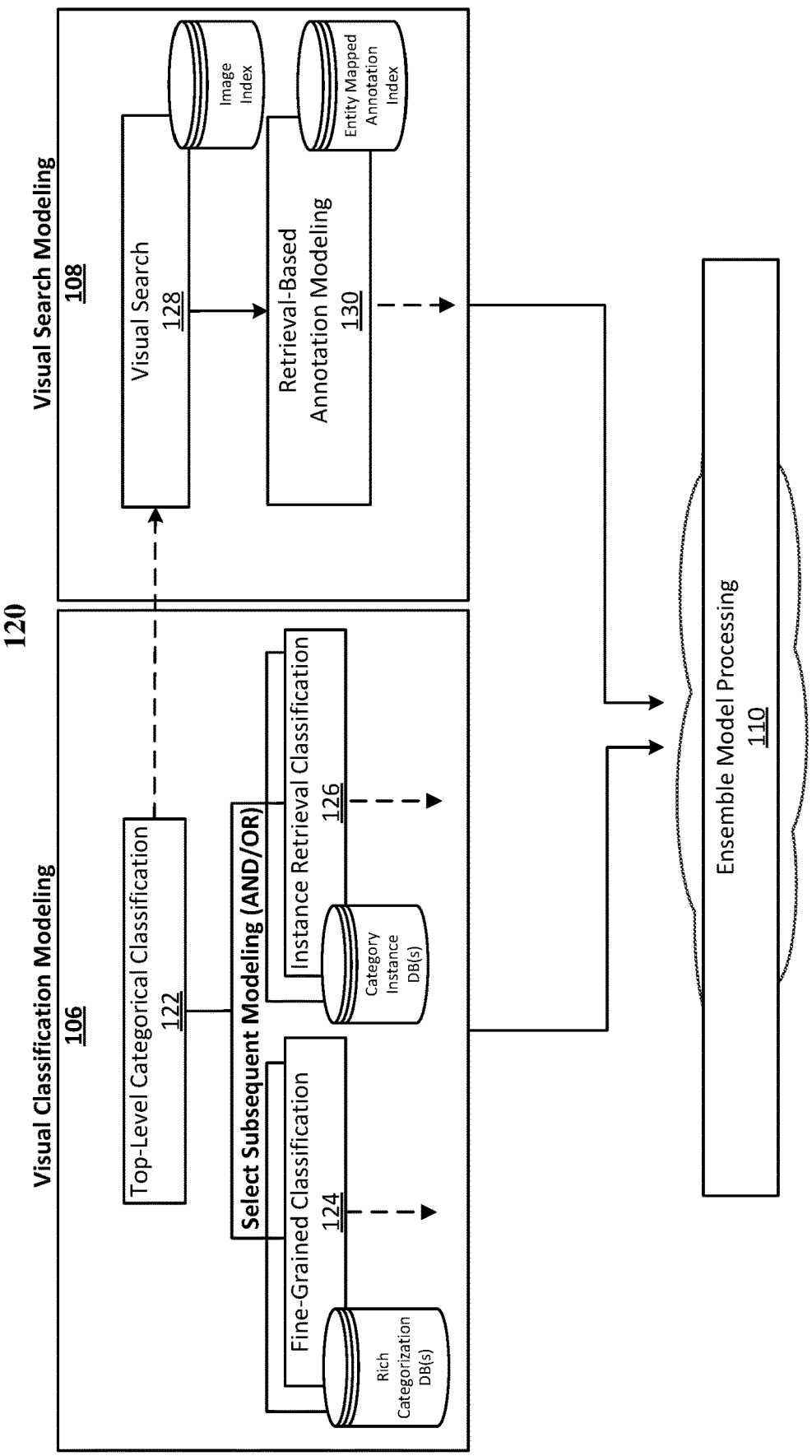

FIGS. 1A-1B illustrate exemplary process flows related to image recognition processing with which aspects of the present disclosure may be practiced. FIG. 1A illustrates process flow 100 providing a flow of processing executed by an exemplary image recognition application/service for image recognition processing. Process flow 100 illustrates an overall exemplary process flow for image recognition processing and process flow 120 (FIG. 1B) illustrates more specific processing operations executed for visual classification modeling 106 and visual search modeling 108. As an example, process flows illustrated in FIGS. 1A-1B may be executed by an exemplary computing device (or multiple computing devices) and/or system such as those shown in FIGS. 4A-6. In one example, processing described herein by the image recognition service may be executed by one or more server computing devices, which may interface with client computing devices executing exemplary applications/services that may be used to access image content.

In one example, operations described herein may be configured as a system and/or service that execute computer programs, application programming interfaces (APIs), neural networks or machine-learning processing and semantic and entity understanding modeling, among other examples. For example, an exemplary computing device and/or application/service may be configured to interface with an exemplary image recognition service (or services) that comprise exemplary components described in the description of FIGS. 1A-1B.

In process flow 100 (FIG. 1A), image content and associated context data 102 may be accessed by an exemplary image recognition application/service. In one example, image content and associated context data may be accessed in real-time, for example, where a user is accessing image content through an application/service. Among other examples, a user may upload an image file while conducting an image search through a search engine service. Image content may comprise one or more image files, for example, that are stored in a memory of a computing device and/or a distributed network storage (and accessed via a client computing device). Context data (or context for the image content) may comprise signal data that accompanies the image content. Context data may be in the form of metadata that is directly associated with the image content (properties, tagging, fields, storage location (e.g. folders, labels) etc.), capture of the image content (e.g. timestamp data, geo-locational data, computing device used to capture image, application/service used to capture), modification of the image content, sharing of the image content (e.g. via social networking services) and user signal data (e.g. user profile data), among other examples. Capture of image content and associated signal data (e.g. context) is known to one skilled in the field of art. Image content and associated context may be propagated to an exemplary image recognition service. An exemplary image recognition service is a web service that is configured to implement components (hardware and/or software) for execution of image recognition processing as described herein. Components of an exemplary image recognition service comprise: an intent determination component, at least two image recognition analysis pipelines, that are executing in parallel, and an exemplary ensemble model for image recognition. In some examples, an intent determination component may be a separate component from the image recognition service, where the image recognitions service is configured to interface with other applications/services to receive inferred intent determination for image content.

In examples where the image recognition service executes intent determination, an exemplary image recognition application/service may be configured to receive the image content (and context data) and determine intent 104 for the image content, which may be utilized by subsequent modeling of the image recognition service for image recognition of the image content. Intent may be an intent inferred from semantic analysis of content portions of the image content, data/metadata associated with the image content and exemplary signal data as described in the foregoing description. For instance, in processing operation 104, semantic analysis is executed on image content and associated context data. Image content, context data and an inferred intent may be propagated to image recognition analysis pipelines that apply, in parallel, different forms of data modeling for image recognition.

An exemplary image recognition analysis pipeline may be configured to implement at least two different data models for image recognition processing from: nearest neighbor visual search analysis, image classification (e.g. categorical image classification) analysis and/or instance retrieval (e.g. categorical instance retrieval) analysis. Individual modeling employed by modeling components of the image recognition analysis pipeline (e.g. a first pipeline and a second pipeline) may further be configured to execute one or more data models from: nearest neighbor visual search analysis, image classification analysis and/or instance retrieval analysis. For instance, two or more different data models for image recognition may be executed in parallel from any of: a category-specific classification model, an instance retrieval classification model and a visual search (e.g. web search model). Data from the respective models may be further shared between the different data models to enhance processing of the image recognition service. While two image recognition analysis pipelines are referenced for explanation purposes, it is to be understood that an exemplary image recognition service is configurable to be scaled to include additional data models that execute specific image recognition analysis on the image content and associated context data.

Image recognition analysis pipelines, as referenced herein, utilizes the image content and context data as inputs to specific modeling for image recognition. Image recognition analysis pipelines of the exemplary image recognition service may comprise: a first image recognition analysis pipeline that executes visual classification modeling 106 and a second image recognition analysis pipeline that executes visual search modeling 108. Processing operations for generation and implementation of exemplary data models for visual intent classification processing and visual search processing are known to one skilled in the field of art. Depending on preliminary processing analysis (e.g. understanding of intent, categorical classification, etc.), the image recognition service may be configured to selectively utilize processing from three different data models that may execute image recognition analysis in parallel. For example, modeling executed within image recognition analysis pipelines may comprise neural networks (e.g. deep neural networking, convolutional neural networking, etc.) or machine-learning processing that are trainable and adaptable (e.g. machine learning model). Further explanation regarding processing associated with visual classification modeling 106 and visual search modeling 108 is described in process flow 120 (FIG. 1B).

The visual classification modeling 106 and the visual search modeling 108 are configured to generate prediction results for image recognition. Prediction results may comprise one or more image recognition designations for image content that are gathered from analysis of the image content and context data associated with the image content. For example, an exemplary prediction result output from visual classification modeling 106 and the visual search modeling 108 may be a list of image recognition predictions (e.g. ranked list) and/or a top ranked image recognition prediction, among other examples. Additional examples of output from specific modeling executed by the visual classification modeling 106 and the visual search modeling 108 is described in process flow 120 (FIG. 1B).

Image content may comprise one or more entities that image recognition processing can be used to identify, where exemplary modeling described herein is configured to identify possible entities within the image content. As an example, prediction results may be ranked results that may be subsequently analyzed by an exemplary ensemble model for image recognition. As an example, the visual classification modeling 106 and visual search modeling 108 may be configured to assign confidence scoring to prediction results for image recognition (e.g. entity recognition within the image content). This assists downstream components such as the ensemble model with assessing correctness of predictions made through visual intent classification modeling 104 and visual search modeling 106. Further explanation regarding generation of prediction results associated with visual intent classification modeling 104 and visual search modeling 106 is described in process flow 120 (FIG. 1B).

Prediction results from the first image recognition analysis pipeline and the second image recognition analysis pipeline are propagated to an ensemble model for image recognition. Exemplary prediction results comprise confidence scoring respectively assigned by the visual classification modeling and the visual search modeling. The ensemble model is configured to analyze the prediction results from the different image recognition analysis pipelines and generate a final ranking for image recognition of the image content. Collectively, the ensemble model is configured to analysis results from the two or more different data models to generate a final ranking for image recognition. In one example, input into an exemplary ensemble model comprises image recognition prediction results from at least 3 different data models that are configured for image recognition analysis as referenced above. Image recognition for the image content may be output based on the final ranking generated by the ensemble model.

The ensemble model for image recognition is configured to execute ensemble model processing 110 of the prediction results. An exemplary ensemble model is an aggregate data model that is configured to combine processing from the different image recognition analysis pipelines to achieve higher precision and higher recall for image recognition. The ensemble model is a trained data model that is configured to evaluate prediction results received from the visual classification modeling 106 and the visual search modeling 108 and generate a final determination as to what image recognition prediction is most correct. An exemplary ensemble model for image recognition is configured to synthesize prediction results generated by the visual classification modeling 106 and the visual search modeling 108 into a final ranking (e.g. ranked score, spread, ranked list, etc.). An exemplary final ranking further comprises evaluating correctness of the prediction results from the image recognition analysis pipelines, for example, based on output from specific modeling associated with the visual classification modeling 106 and the visual search modeling 108. That is, output from the visual classification modeling 106 and the visual search modeling 108 is input into the ensemble model to generate a final determination of image recognition (e.g. entity identification) of the image content.

In one example, the ensemble model may be trained from image-entity pairs (e.g. image-entity prediction pairs) that are confirmed through crowd-sourcing (e.g. human selection/annotation). An image-entity pair is an association between image content and entity data (e.g. retrieved from entity/annotation database, separate entity modeling, etc.). While an image-entity pair is described for ease of understanding, it is to be understood that other types of annotations associating image content with entities (including various levels of categorization and entity evaluation) may be generated through processing by any component of the image recognition service. Image-entity pairs are just one example of training data that can be used for evaluation of correctness of image recognition prediction results. Training of data for an exemplary ensemble model for image recognition (including other forms of ranked and annotated data) may vary according to processing operations known to one skilled in the field of art without departing from the spirit of the present disclosure. An exemplary ensemble model may be configured to utilize the image-entity pairs to evaluate correctness of prediction results propagated to the ensemble model by the image recognition service. For instance, the ensemble model is configured to take image content and a specific image recognition prediction (e.g. specific landmark, entity, etc.) and determine whether the modeling is correct or not in associating the image content with the image recognition prediction. Selection and ranking associated with data modeling (e.g. ensemble data modeling) may vary according to alternative processing operations known to known by one skilled in the field of art without departing from the spirit of the present disclosure.

In examples, image-entity pairs may be used to analyze specific outputs from the visual classification modeling 106 and the visual search modeling 108, where the ensemble model makes a final determination for image recognition (e.g. association of an entity with image content) based on analysis of the outputs from the image recognition analysis pipelines. For instance, the ensemble model provides a unified architecture that can achieve image recognition at scale for a plurality of different image recognition analysis models, contemplating all outputs from the image recognition analysis pipelines. Processing for ranking and selection of an output (of the ensemble model) may vary according by developer specification, where different ranking/selection algorithms can be implemented as are known to one skilled in the field of art.

In one example, prediction results from two or more different data models (e.g. categorical classification model, instance retrieval classification model and visual search modeling) may be analyzed to generate a final image recognition for the image content. For instance, output from specific modeling executed by the image recognition analysis pipelines may vary depending on the data available for processing. Output from any of the different image recognition data models may be utilized to generate the final determination as to image recognition for the image content.

In one alternative example, an exemplary ensemble model may be configured to select prediction results from a specific image recognition analysis pipeline based on evaluation of associated confidence scoring (in association with the training of the ensemble model). For instance, the exemplary ensemble model may be configured to select one of image prediction results between the visual classification modeling 106 and the visual search modeling 108, for example, based on a threshold analysis of confidence scoring assigned to the prediction result (e.g. by either the visual classification modeling 106 and the visual search modeling 108). In one instance, the visual classification modeling 106 may classify an image of tower structure as the Eiffel Tower and assign a confidence score of (0.8 or 80 percent) to that prediction. The ensemble model may confirm an image-entity pair associated with the prediction result and further evaluate the confidence score to determine whether the confidence score falls within an acceptable threshold for selection of that prediction result as an output for image recognition. As an example, the ensemble model may do a threshold comparison of a prediction result from the visual classification modeling 106 and the visual search modeling 108 and select which model is more likely to be correct based on the analysis of the image-entity pair and the threshold (confidence score evaluation). Continuing the above Eiffel Tower example, the visual search modeling 108 may have generated a prediction result that classifies the image of the tower structure as a specific oil rig with a confidence score of (0.4 or 40 percent), which may lead to the ensemble model selecting the prediction result of the visual classification modeling 106 over the prediction result of the visual search modeling 108. Thresholds for evaluation of prediction results and/or comparison of prediction results between different image recognition modeling may be set by developers and vary during implementation.

In another example, an exemplary ensemble model may be configured to compare data from prediction results of the visual classification modeling 106 and the visual search modeling 108 to validate a prediction for image recognition. For instance, a prediction result from the visual classification modeling 106 may determine image content is associated with a landmark of the Eiffel Tower and a prediction results from the visual search modeling 108 may also confirm that the image content is associated with the Eiffel Tower landmark. The ensemble model may be configured to output a prediction for image recognition based on the validation of the image recognition.

Moreover, an exemplary ensemble model is generalizable for image recognition processing. That is, an exemplary ensemble model is not limited to any specific vocabulary, language, classification, etc. As an example, a first iteration of the ensemble model may be configured to work with 10,000 entities and a future iteration can be trained to work with 100,000. Further, an exemplary ensemble model is scalable to work with different image recognition processing models. For instance, if a categorization is added to a component of the visual intent classification modeling 104 or another pipeline is added to the image recognition analysis pipelines, an exemplary ensemble model may be easily adapted through training data. Image-entity pairs (or other annotations) may be updated to enable the ensemble model to evaluate correctness of image recognition predictions received.

Flow of process flow 100 may proceed to 110, where image recognition results are output by the ensemble model. As indicated in the foregoing, the ensemble model may be configured to generate a final ranking of prediction results for image recognition. An exemplary final ranking may be utilized to determine one or more image recognition predictions to output. As referenced above, an ensemble model may be configured to implement threshold evaluation to determine an image recognition prediction for output. In one example, a highest ranked prediction result (from either of the image recognition analysis pipelines) may be output by the ensemble model. In another example, multiple prediction results that satisfy a threshold evaluation may be output. Output of prediction results may further vary based on evaluation of an application/service that is receiving the image recognition. For instance, the ensemble model may identify that signal data (e.g. context data) associated with the image content indicates that the image content is being uploaded as part of an image search through a search engine service and direct the image recognition output to the search engine service for subsequent processing. Exemplary applications/services may be configured to interface with an exemplary image recognition service to receive and process image recognition results. In the continued search engine service example, the search engine service may utilize the image recognition result to annotate the image and/or provide suggestive data objects to enhance productivity and user interaction.

Moreover, in some examples, the ensemble model may be configured to filter image recognition output, for example, to avoid the output of offensive, inappropriate, insensitive, etc. content from being output through applications/services. In at least one example, processing operations for filtering may have a fallback classification that avoids labeling of such content, where other portions of the image content are focused on for image recognition purposes. As an example, the image-entity pairs may be utilized to evaluate/judge image recognition designations for output. An exemplary data model may be trained to evaluate/judge the image content and generate a final determination as to whether image recognition should be output. In alternate examples, filtering processing is executed by a productivity service that is receiving the image recognition. In such an instance, image recognition may be output to the productivity service to execute filtering.

Referring now to process flow 120 (FIG. 1B), process flow 120 illustrates a process flow breakdown of specific processing executed by the visual intent classification modeling 104 and the visual search modeling 106.

As shown in process flow 120, exemplary visual classification modeling 106 described herein may be configured to execute top-level categorical classification 122 for image content based on an analysis of the image content, a context associated with the image content and inferred intent. For instance, an exemplary data model (or data models) may be executed to analyze the image content and associated signal data to determine a categorical classification for the image content. Such data analysis modeling is known to one skilled in the field of art. A categorical classification of the image content may be determined and propagated for subsequent classification modeling and visual search modeling, which can enhance processing of downstream image recognition components. Categorical classification may be propagated to one or more data models for visual classification modeling (e.g. category-specific classification model and/or instance retrieval classification model). As illustrated in process flow 120, an exemplary top-level categorization classification may be propagated to subsequent components of the visual classification modeling 106 and the visual search modeling 108.

In one example, a specific classification model is selected based on the top-level categorical classification. For instance, following flow through the components of the visual classification modeling 106, processing may select one or more subsequent models for classification-based image recognition. In some instances, a category-specific classification model (e.g. data model identifying specific entities, sub-categorizations, etc. for a specific category) may be available that corresponds with a top-level categorical classification. However, as category-specific classification models often require large sets of training samples and a large amount of processing resources, category-specific classification models may not be available for all categorizations. As such, subsequent classification processing may also be useful for image recognition of image content. In some examples, existence of a category-specific classification model may be determined during top-level categorical classification modeling 122. For instance, processing by the visual classification modeling 106 may selectively determine to propagate data for subsequent processing by a fine-grained classification model 124 based on the existence of a category-specific classification model that corresponds with the top-level categorical classification. In other instances, propagated data may be analyzed by the fine-grained classification model 124 even when a trained data model does not exist for the top-level categorization classification. In such instances, application of a different categorization model may still generate results that are beneficial for analysis by an exemplary ensemble model when considering prediction results in aggregate across different image recognition data models. Hence, different processing examples may exist where both fine-grained classification modeling 124 and instance retrieval classification modeling 126 are executed and other examples may select one or the other (e.g. and/or).

An exemplary fine-grained classification model 124 is configured to analyze propagated data using a category-specific classification model. A fine-grained classification model 124 may be configured to access one or more databases for rich categorization (e.g. categorized data model). Examples of fine-grained classification models are known to one skilled in the field of art. The fine-grained classification modeling 124 provides high-precision image based classification but needs to be bootstrapped per category (e.g. be associated with category-specific databases). An exemplary category-specific data may be specifically trained using thousands of images and annotations that pertain to category-specific analytics. Category-specific data models are very robust and require a large amount of resources and time for training and maintenance, making them less scalable than other image recognition modeling (e.g. instance retrieval and visual search (web/annotation). Prediction results output from the fine-grained classification model 124 may be useful to judge correctness for confirming an entity within a specific categorization (e.g. for a categorization of landmarks, identifying that a tower structure is the Eiffel Tower as opposed to the Empire State Building). Output from an exemplary fine-grained classification modeling 124 may comprise entity identification, confidence scoring, related annotations, etc.

In parallel, the image content, associated context data, inferred intent and top-level categorization classification may be propagated to an instance retrieval classification model 126 that utilizes the top-level categorical classification in a trained model to evaluate image content according to the top-level classification. Examples of instance retrieval classification models are known to one skilled in the field of art. The instance retrieval classification model 126 may be configured to execute a visual search that is category specific (e.g. landmark, person, animal, etc.) comparing image content to existing image content to identify the closest match (e.g. nearest neighbor search (NNS), proximity search) in a given category by accessing category instances databases. An exemplary instance retrieval classification model 126 may be trained to analyze image content (and annotations) for respective categorizations to more efficiently execute image search analyze than generally searching a web search index when accessing image content from the category instance databases. While the instance retrieval classification model 126 is searches classification, such processing requires fewer data samples per category to get bootstrapped to other data model processing. For example, outputs from the fine-grained classification modeling 124 and annotations (e.g. entity mapping annotated vocabulary) associated with the visual search model 106 may be used to feed into categorical instance analysis to improve precision and recall of the instance retrieval classification model 126. Output from the instance retrieval classification model 126 may comprise identification of nearest neighbor images, entity identification and a metric associating how close in proximity the candidate image is to the image content.

Moreover, a top-level categorical classification may be propagated to an exemplary visual search modeling 108, that executes a visual search (e.g. via web index) to identify nearest neighbor images for the image content. The visual search modeling 108 provides high recall and low precision coverage for unbounded set of categories as it leverages large scale web indexes and propagates text annotations based on visual search results. For instance, visual search modeling 108 may comprise execution of a visual search model 128 that performs a nearest neighbor image search to identify closest image matches for the image content. The visual search model 128 may access one or more image indices to identify nearest neighbors for the image content. Output from the visual search model 128 may comprise identification of nearest neighbor images, entity identification and a metric associating how close in proximity the candidate image is to the image content. Output from the visual search model 128 may be propagated to a retrieval-based annotation model 130. The retrieval-based annotation model 130 is configured to add annotations to the identified nearest neighbor images, for example, without depending on specific categorical classification. The retrieval-based annotation model 130 may be configured to interface with entity-mapped annotation indices to generate annotated prediction results (e.g. image-entity pairs) for image recognition. Propagated data from other components of the image recognition service (e.g. top-level categorical classification, results from fine-grained classification modeling 124 and instance retrieval classification modeling 126) may also be useful to identify most appropriate prediction results. Output from the retrieval-based annotation model 130 may comprise annotation data (e.g. notes, explanations, markup, related terms/linked data, etc.), entity identification and scoring for association between entity data and the image content, among other examples.

Outputs from the visual search model 128, the retrieval-based annotation model 130, the fine-grained classification model 124 and/or the instance retrieval classification model 126 may be propagated to the ensemble model processing 110 operation as described in process flow 100 (FIG. 1A).

FIG. 2 illustrates an exemplary method 200 related to image recognition processing with which aspects of the present disclosure may be practiced. As an example, method 200 may be executed by an exemplary computing device (or computing devices) and/or system such as those shown in FIGS. 4A-6. For instance, processing operations described herein may be executed by one or more components of an image recognition service that may be configured to interface with a computing device (or devices) and/or applications/services executing thereon. Operations performed in method 200 may correspond to operations executed by a system and/or service that execute computer programs, application programming interfaces (APIs), neural networks or machine-learning processing and semantic and entity understanding modeling, among other examples. As an example, processing operations executed in method 200 may be performed by one or more hardware components. In another example, processing operations executed in method 200 may be performed by one or more software components. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where an exemplary service for image recognition processing is exposed for interfacing with other applications/services. An exemplary service for image recognition processing may be an image recognition service as referenced in the foregoing description. The image recognition service may interface with any of a plurality of applications/services to provide image recognition functionality to enhance operation of the applications/services.

An exemplary application/service is a productivity service. An exemplary productivity application/service is an application/service configured for execution to enable users to complete tasks on a computing device. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, directory applications/services, mapping services, calendaring services, electronic payment services, digital storage applications/services and social networking applications/services, among other examples. In some examples, an exemplary productivity application/service may be a component of a suite of productivity applications/services that may be configured to interface with other applications/services associated with a platform. For example, a word processing service may be included in a bundled service (e.g. Microsoft® Office365® or the like). Further, an exemplary productivity service may be configured to interface with other internet sources/services including third-party application/services, for example, to enhance functionality of the productivity service.

Exposure (processing operation 202) of an exemplary image recognition service may comprise processing operations (e.g. calls, requests/responses, etc.) between an application/service and the image recognition service. In one example, an application/service may interface with an exemplary image recognition service through an API. Moreover, exposure (processing operation 202) of the image recognition service comprises providing an updated image recognition service. Modeling provided as components of the image recognition service may be continuously trained and updated to provide application/services with the highest precision and highest recall image recognition in a scalable form.

Method 200 may proceed to processing to processing operation 204, where image content and associated signal data is accessed. Processing operation 204 may comprise receiving a request for access to the image content in real-time through an exemplary application/service (e.g. productivity service) that corresponds with active access to the image content. For instance, a user may be actively accessing the image content through a camera application/service of a mobile computing device, uploading the image content for an image search through a search engine service, etc. In other instances, access (processing operation 204) to image recognition processing may not rely on an active usage of the image content by a user. For instance, the image recognition service may be configured to parse image content of an application/service (on a computing device, distribute network resource, etc.) and proactively initiate the image recognition processing to improve productivity of applications/services, among other examples.

Flow of method 200 may proceed to processing operation 206, where the image content and context is analyzed by the image recognition service. Examples of processing for analysis by components of the image recognition service is provided in the foregoing description of process flow 100 (FIG. 1A) and process flow 120 (FIG. 1B). For instance, intent may be determined/inferred based on analysis of the image content and context data (e.g. signal data) associated with the image content. Data may be propagated to downstream components of the image recognition service, for example, where the image recognition service may be configured to analyze propagated data using at least two image recognition analysis pipelines that are executing in parallel. As described in the foregoing description of process flow 100 (FIG. 1A) and process flow 120 (FIG. 1B), exemplary image recognition analysis pipelines comprise: a first image recognition analysis pipeline that executes visual classification modeling and a second image recognition analysis pipeline that executes visual search modeling. Refer to foregoing description of FIGS. 1A-1B for additional processing operation details.

Analysis (processing operation 206) by the at least two image recognition analysis pipelines yields prediction results for image recognition that are used as inputs to an exemplary ensemble model as described in the foregoing description. At processing operation 208, prediction results from the first image recognition analysis pipeline and the second image recognition analysis pipeline are propagated to an ensemble model for image recognition. Exemplary prediction results comprise confidence scoring assigned respectively by the visual intent classification modeling and the visual search modeling.

At processing operation 210, an exemplary ensemble model is implemented to analyze the prediction results propagated from the image recognition analysis pipelines. Processing operation 210 comprises generating, using the ensemble model, a final ranking for image recognition of the image content based on an analysis of the first image recognition prediction result (e.g. associated with visual classification modeling) and the second image recognition prediction result (associated with visual search modeling) by the ensemble model. Generation of an exemplary final ranking is described in the foregoing description of process flow 100 (FIG. 1A) and process flow 120 (FIG. 1B).

Flow of method 200 may proceed to processing operation 212, where an image recognition for the image content may be output by the ensemble model. An image recognition may be output (processing operation 212) based on the final ranking generated by the ensemble model. In one example, output (processing operation 212) of the image recognition comprises transmitting the image recognition to an exemplary application/service, which may utilize the image recognition for subsequent processing. In one instance, an exemplary application/service may be configured to surface the image recognition in association with the image content. For instance, in a system example, an exemplary productivity service, interfacing with the image recognition service, may receive the image recognition, associate the image recognition with a specific portion of the image content and surface the image recognition with the associated image content. In further examples, output of the image recognition may comprise providing, to a productivity service, all related data associated with the image recognition including annotations, facts, associated links, related terms, related image content, etc. An exemplary productivity service may utilize such data to generate suggestive content associated with entity recognition within the image content.

Flow of method 200 may proceed to decision operation 214, where it is determined whether there is additional training for one or more components of the image recognition service. In examples where no update occurs to any components of the image recognition service, flow of decision operation 214 branches NO and processing of method 200 remains idle until subsequent processing is to occur. In some instances, additional training data becomes available that may trigger update of a component of the image recognition service. For instance, new image-entity pairs may be generated and used to train an exemplary ensemble model. In other instances, new categories or segments may be added to enhance visual classification modeling (106 of FIG. 1A), new images and annotations added for retrieval modeling, etc. In examples where update occurs to one or more components of the image recognition service (e.g. data models of the image recognition analysis pipelines, ensemble model), flow of decision operation 214 branches YES and processing of method 200 returns to processing operation 202. As referenced in the foregoing description, exposure of an exemplary service for image recognition processing (e.g. image recognition service) may comprise exposing updated/trained components (e.g. image recognition analysis pipelines and ensemble model) for real-time access to an image recognition service that provides high precision and recall.

Figure 3A:
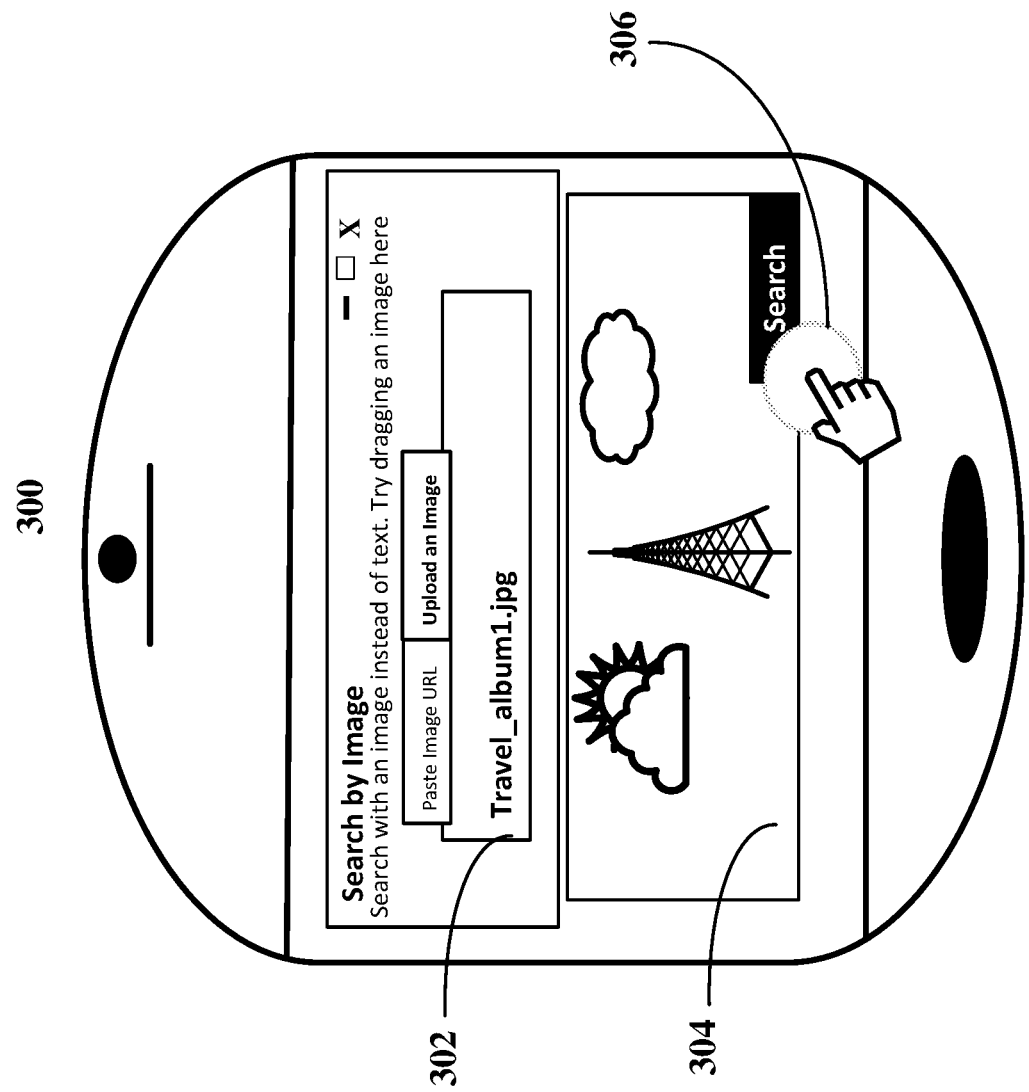

FIGS. 3A-3B illustrate exemplary processing device views presenting user interface examples that illustrate results from image recognition processing with which aspects of the present disclosure may be practiced. User interface examples are shown in association with exemplary productivity applications/services, where processing device views shown in FIGS. 3A-3B are front-end examples of processing operations that correspond to surfacing of an exemplary image recognition based on execution of the processing operations described in FIGS. 1A-1B and method 200 (FIG. 2).

FIG. 3A illustrates processing device view 300, providing a display of a user interface for an exemplary productivity application/service such as web search service. As shown in processing device view 300, a user is initiating an image search 302, where an image content 304 (travel_album1.jpg) is being uploaded to the image search service. The user, through the user interface of the web search service, may execute an action 306 that selects to initiate search of the image content 304. In one example, upload of the image content to the web search service may trigger image recognition processing as described herein. In another example, execution of the action 306 may be a trigger for image recognition as described herein. Alternatively, as referenced in the foregoing, image recognition processing may occur behind the scenes (either offline or as background processing while the user in working in another application/service).

FIG. 3B illustrates processing device view 320, providing continued example of that shown in processing device view 300 (FIG. 3A). Processing device view 320 illustrates display of a user interface for an exemplary productivity application/service that comprises surfacing of an exemplary image recognition 322 for the uploaded image content 304. As referenced previously, exemplary image recognition processing may determine a most appropriate/correct image recognition (or recognitions) for the image content and output the image recognition to an exemplary application/service (e.g. such as the web search service shown in FIGS. 3A-3B). In further examples, output of the image recognition may comprise providing, to a productivity service, all related data associated with the image recognition including annotations, facts, associated links, related terms, related image content, etc. An exemplary productivity service may utilize such data to generate suggestive content associated with entity recognition within the image content. For example, the productivity service may output fact 324 associated with the entity identified in the image content as well as rich data object 326 (e.g. a link that is associated with the image content). In further examples, a user may select user interface feature 328 for viewing of additional search results. As an example, additional search results displayed may comprise additional data associated with image recognition, which may include alternative image recognition results, user interface features for a user to confirm accuracy of the image recognition, etc.

FIGS. 4A-6 and the associated descriptions provide a discussion of a variety of operating environments in which examples of the invention may be practiced. However, the devices and systems illustrated and discussed with respect to FIGS. 4A-6 are for purposes of example and illustration and are not limiting of a vast number of computing device configurations that may be utilized for practicing examples of the invention, described herein.

Figure 4A:
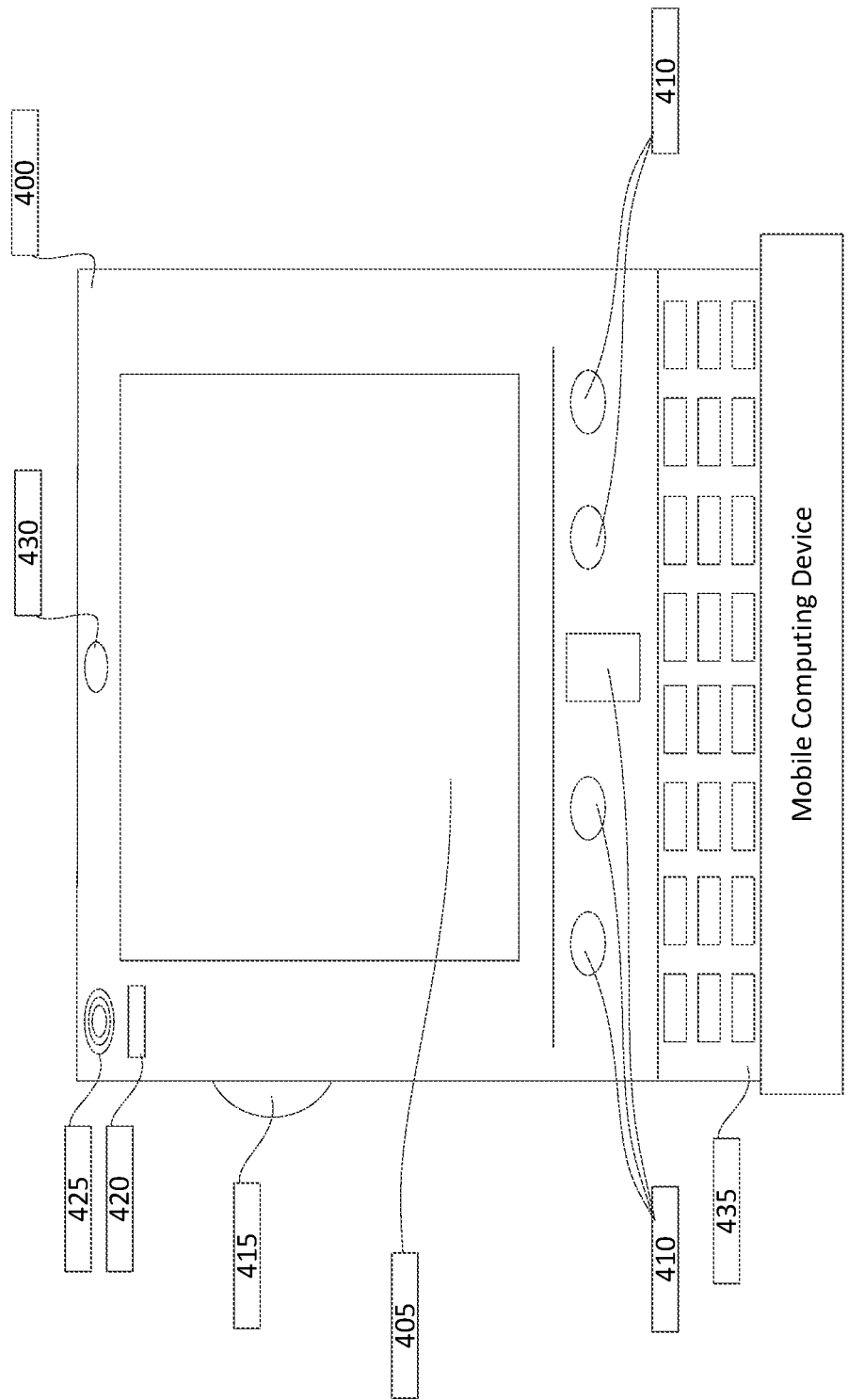
FIGS. 4A and 4B are simplified block diagrams of a mobile computing device with which aspects of the present disclosure may be practiced.
Figure 4B:
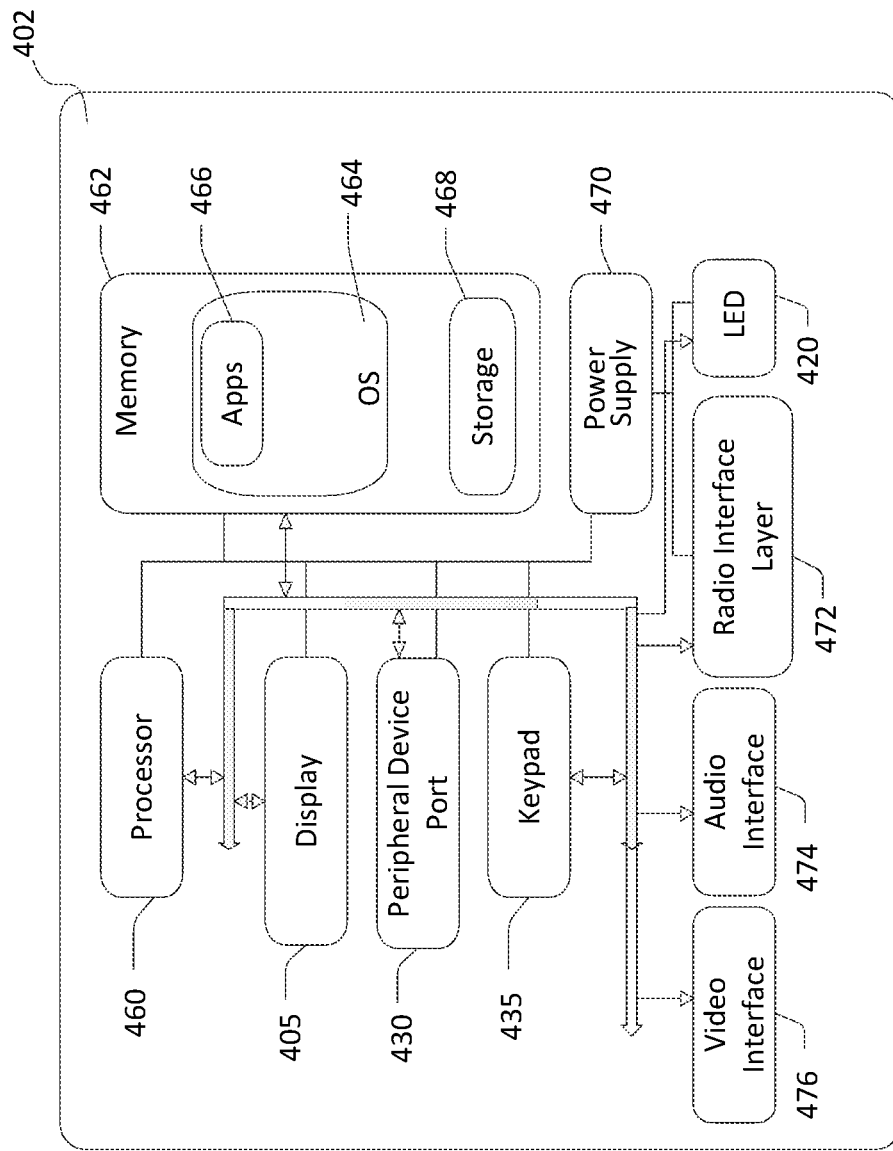

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for image recognition processing as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

Figure 5:
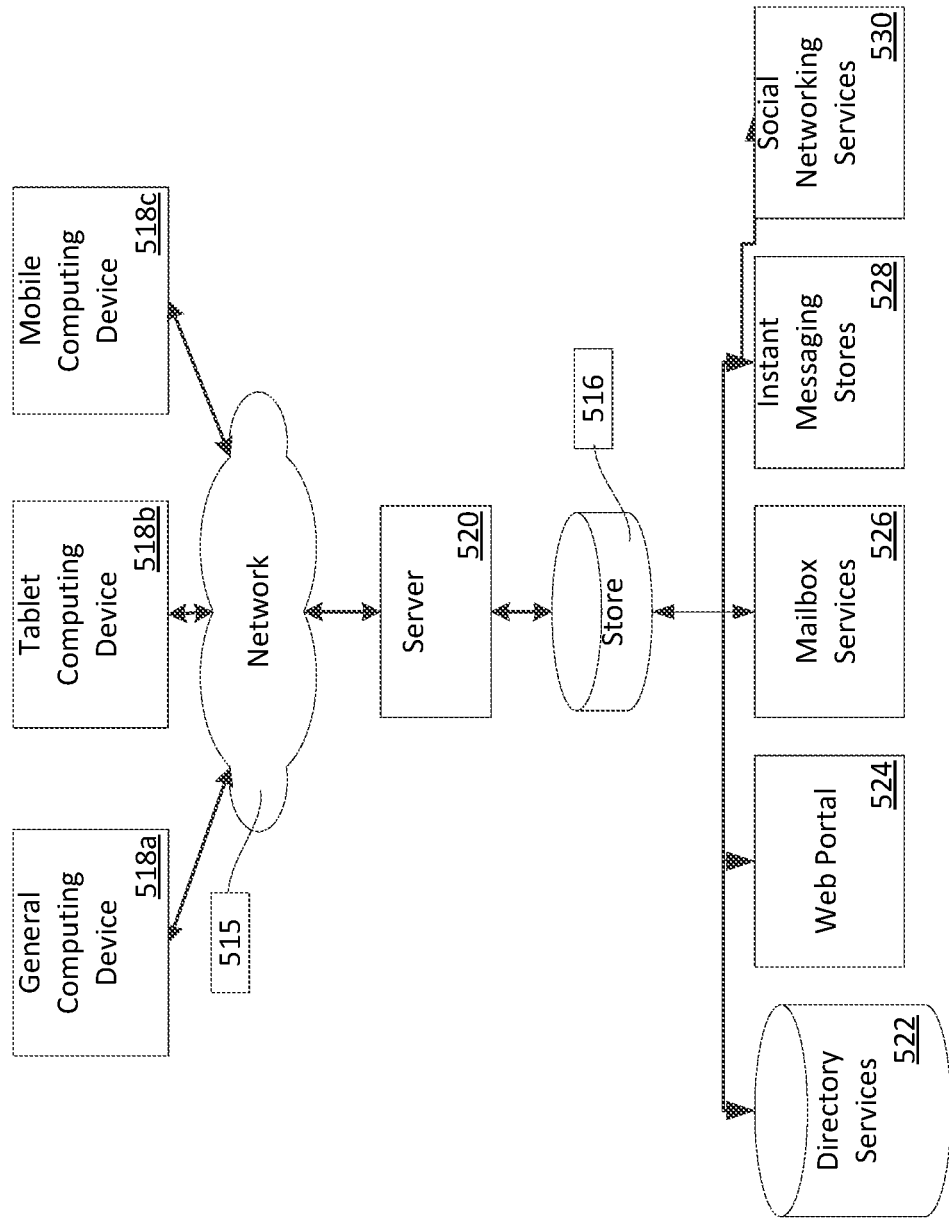
FIG. 5 is a simplified block diagram of a distributed computing system in which aspects of the present disclosure may be practiced.

FIG. 5 illustrates one example of the architecture of a system for providing an application that reliably accesses target data on a storage system and handles communication failures to one or more client devices, as described above. The system of FIG. 5 may be an exemplary system configured for image recognition processing as described herein. Target data accessed, interacted with, or edited in association with programming modules 608 and/or applications 620 and storage/memory (described in FIG. 6) may be stored in different communication channels or other storage types. For example, various documents may be stored using a directory service 522, a web portal 524, a mailbox service 526, an instant messaging store 528, or a social networking site 530, IO manager 624, other utility 626, application 628 and storage systems may use any of these types of systems or the like for enabling data utilization, as described herein. A server 520 may provide storage system for use by a client operating on general computing device 602 and mobile device(s) 400 through network 515. By way of example, network 515 may comprise the Internet or any other type of local or wide area network, and a client node may be implemented for connecting to network 515. Examples of a client node comprise but are not limited to: a computing device 602 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 602 or 400 may obtain content from the store 516.

Figure 6:
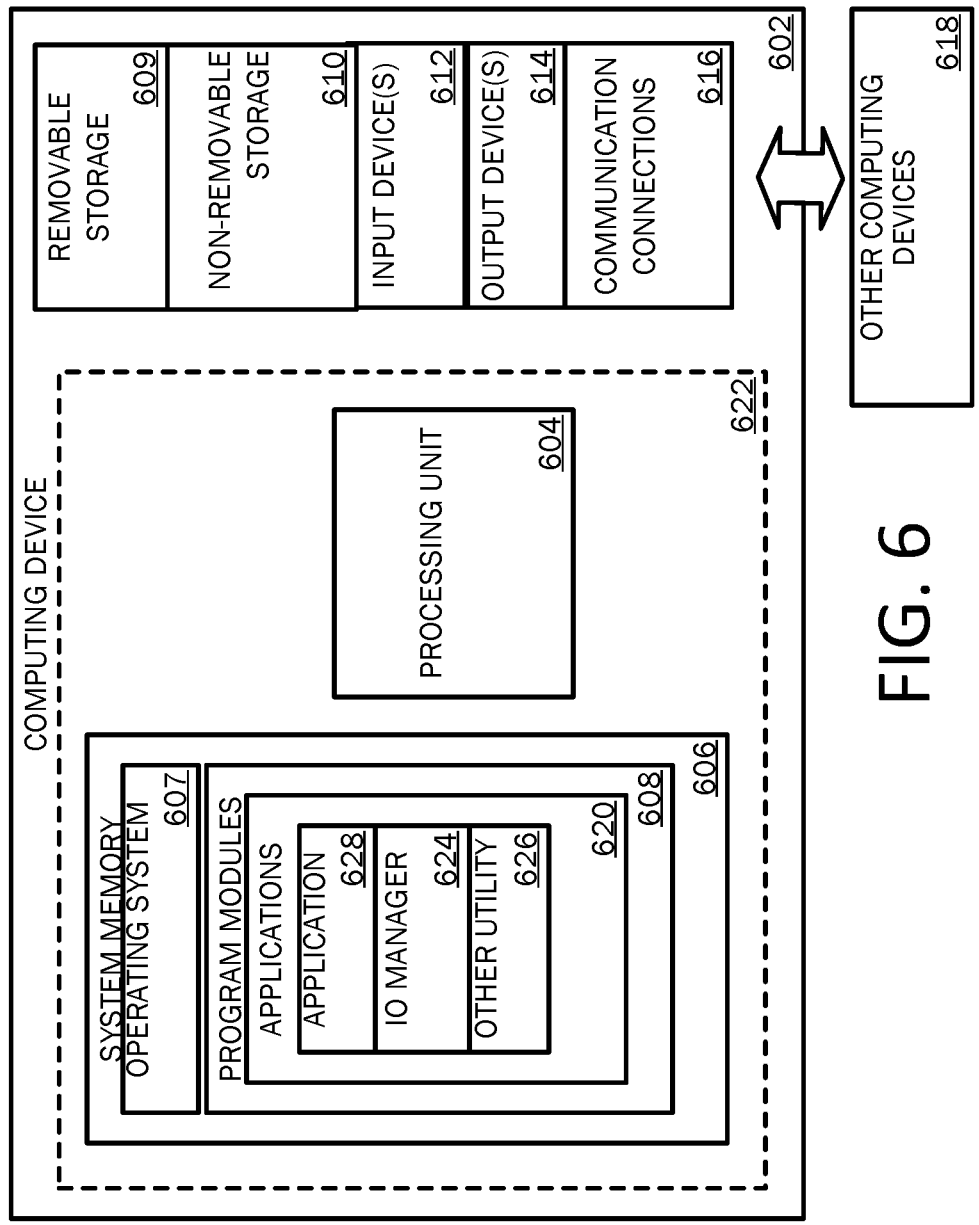
FIG. 6 is a block diagram illustrating an example of a computing device with which aspects of the present disclosure may be practiced.

FIG. 6 is a block diagram illustrating physical components of a computing device 602, for example a mobile processing device, with which examples of the present disclosure may be practiced. Among other examples, computing device 602 may be an exemplary computing device configured for image recognition processing as described herein. An exemplary computing device may be a server (or replicated as a group of servers) that are configured to execute components of an exemplary image recognition service. In a basic configuration, the computing device 602 may include at least one processing unit 604 and a system memory 606. Depending on the configuration and type of computing device, the system memory 606 may comprise, but is not limited to, volatile storage (e.g., random access memory), non-volatile storage (e.g., read-only memory), flash memory, or any combination of such memories. The system memory 606 may include an operating system 607 and one or more program modules 608 suitable for running software programs/modules 620 such as IO manager 624, other utility 626 and application 628. As examples, system memory 606 may store instructions for execution. Other examples of system memory 606 may store data associated with applications. The operating system 607, for example, may be suitable for controlling the operation of the computing device 602. Furthermore, examples of the invention may be practiced in conjunction with a graphics library, other operating systems, or any other application program and is not limited to any particular application or system. This basic configuration is illustrated in FIG. 6 by those components within a dashed line 622. The computing device 602 may have additional features or functionality. For example, the computing device 602 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 606. While executing on the processing unit 604, program modules 608 (e.g., Input/Output (I/O) manager 624, other utility 626 and application 628) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, other productivity services, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 602 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 602 may also have one or more input device(s) 612 such as a keyboard, a mouse, a pen, a sound input device, a device for voice input/recognition, a touch input device, etc. The output device(s) 614 such as a display, speakers, a printer, etc. may also be included. The aforementioned devices are examples and others may be used. The computing device 602 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 606, the removable storage device 609, and the non-removable storage device 610 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 602. Any such computer storage media may be part of the computing device 602. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   executing visual classification modeling on image content, wherein the executing of the visual classification modeling comprises:
      selecting a category-specific classification model to analyze the image content based on an image classification of the image content, and
      analyzing the image content using the category-specific classification model;
   executing visual search modeling on the image content using the image classification;
   propagating, to an ensemble model, image recognition results that comprise a first image recognition prediction result of the image content from the executing of the visual classification modeling and a second image recognition prediction result of the image content from the executing of the visual search modeling;
   generating, using the ensemble model, a ranking for image recognition of the image content based on an analysis of the first image recognition prediction result and the second image recognition prediction result by the ensemble model; and
   outputting the image recognition for the image content based on the ranking generated by the ensemble model.

2. The method of claim 1, wherein the image content is obtained from a visual media object.

3. The method of claim 1, wherein the first image recognition prediction result comprises confidence scoring assigned by the visual classification modeling and the second image recognition prediction result comprises confidence scoring assigned by the visual search modeling.

4. The method of claim 1, wherein the executing of the visual classification modeling further comprises: determining a top-level categorical classification as the image classification and propagating the image content and the top-level categorical classification to the visual search modeling.

5. The method of claim 1, further comprising: transmitting the image recognition for the image content to an application or service for subsequent processing.

6. The method of claim 1, wherein the ensemble model is trained using image-entity prediction pairs, and wherein the generating of the ranking further comprises evaluating correctness of the first image recognition prediction result and the second image recognition prediction result based on the image-entity prediction pairs.

7. The method of claim 1, wherein the analysis of the first image recognition prediction result and the second image recognition prediction result by the ensemble model comprises: comparing the first image recognition prediction result and the second image recognition prediction result for a validation of the image recognition, and wherein the image recognition is output based on the validation of the image recognition.

8. A system comprising:
   at least one processor; and
   a memory, operatively connected with the at least one processor, storing computer-executable instructions that, when executed by the at least one processor, causes the at least one processor to execute a method that comprises:
      executing visual classification modeling on image content, wherein the executing of the visual classification modeling comprises:
         selecting a category-specific classification model to analyze the image content based on an image classification of the image content, and
         analyzing the image content using the category-specific classification model;
      executing visual search modeling on the image content using the image classification;
      propagating, to an ensemble model, image recognition results that comprise a first image recognition prediction result of the image content from the executing of the visual classification modeling and a second image recognition prediction result of the image content from the executing of the visual search modeling;
      generating, using the ensemble model, a ranking for image recognition of the image content based on an analysis of the first image recognition prediction result and the second image recognition prediction result by the ensemble model; and
      outputting the image recognition for the image content based on the ranking generated by the ensemble model.

9. The system of claim 8, wherein the image content is obtained from a visual media object.

10. The system of claim 8, wherein the first image recognition prediction result comprises confidence scoring assigned by the visual classification modeling and the second image recognition prediction result comprises confidence scoring assigned by the visual search modeling.

11. The system of claim 8, wherein the executing of the visual classification modeling further comprises: determining a top-level categorical classification as the image classification and propagating the image content and the top-level categorical classification to the visual search modeling.

12. The system of claim 8, wherein the method, executed by the at least one processor, further comprises: transmitting the image recognition for the image content to an application or service for subsequent processing.

13. The system of claim 8, wherein the ensemble model is trained using image-entity prediction pairs, and wherein the generating of the ranking further comprises evaluating correctness of the first image recognition prediction result and the second image recognition prediction result based on the image-entity prediction pairs.

14. The system of claim 8, wherein the analysis of the first image recognition prediction result and the second image recognition prediction result by the ensemble model comprises: comparing the first image recognition prediction result and the second image recognition prediction result for a validation of the image recognition, and wherein the image recognition is output based on the validation of the image recognition.

15. A method comprising:
executing visual classification modeling on image content, wherein the executing of the visual classification modeling comprises:
selecting a category-specific classification model to analyze the image content based on an image classification of the image content, and
analyzing the image content using the category-specific classification model;
executing visual search modeling on the image content using the image classification;
propagating, to an ensemble model, image recognition results that comprise a first image recognition prediction result of the image content from the executing of the visual classification modeling and a second image recognition prediction result of the image content from the executing of the visual search modeling;
generating, using the ensemble model, a ranking for image recognition of the image content based on an analysis of the first image recognition prediction result and the second image recognition prediction result by the ensemble model; and
transmitting the image recognition for the image content to an application or service for subsequent processing based on the ranking generated by the ensemble model.

16. The method of claim 15, wherein the image content is obtained from a visual media object.

17. The method of claim 15, wherein the first image recognition prediction result comprises confidence scoring assigned by the visual classification modeling and the second image recognition prediction result comprises confidence scoring assigned by the visual search modeling.

18. The method of claim 15, wherein the executing of the visual classification modeling further comprises: determining a top-level categorical classification as the image classification and propagating the image content and the top-level categorical classification to the visual search modeling.

19. The method of claim 15, wherein the ensemble model is trained using image-entity prediction pairs, and wherein the generating of the ranking further comprises evaluating correctness of the first image recognition prediction result and the second image recognition prediction result based on the image-entity prediction pairs.

20. The method of claim 15, wherein the analysis of the first image recognition prediction result and the second image recognition prediction result by the ensemble model comprises: comparing the first image recognition prediction result and the second image recognition prediction result for a validation of the image recognition, and wherein the image recognition is output based on the validation of the image recognition.

\* \* \* \* \*